2,713,352
Patented July 19, 1955

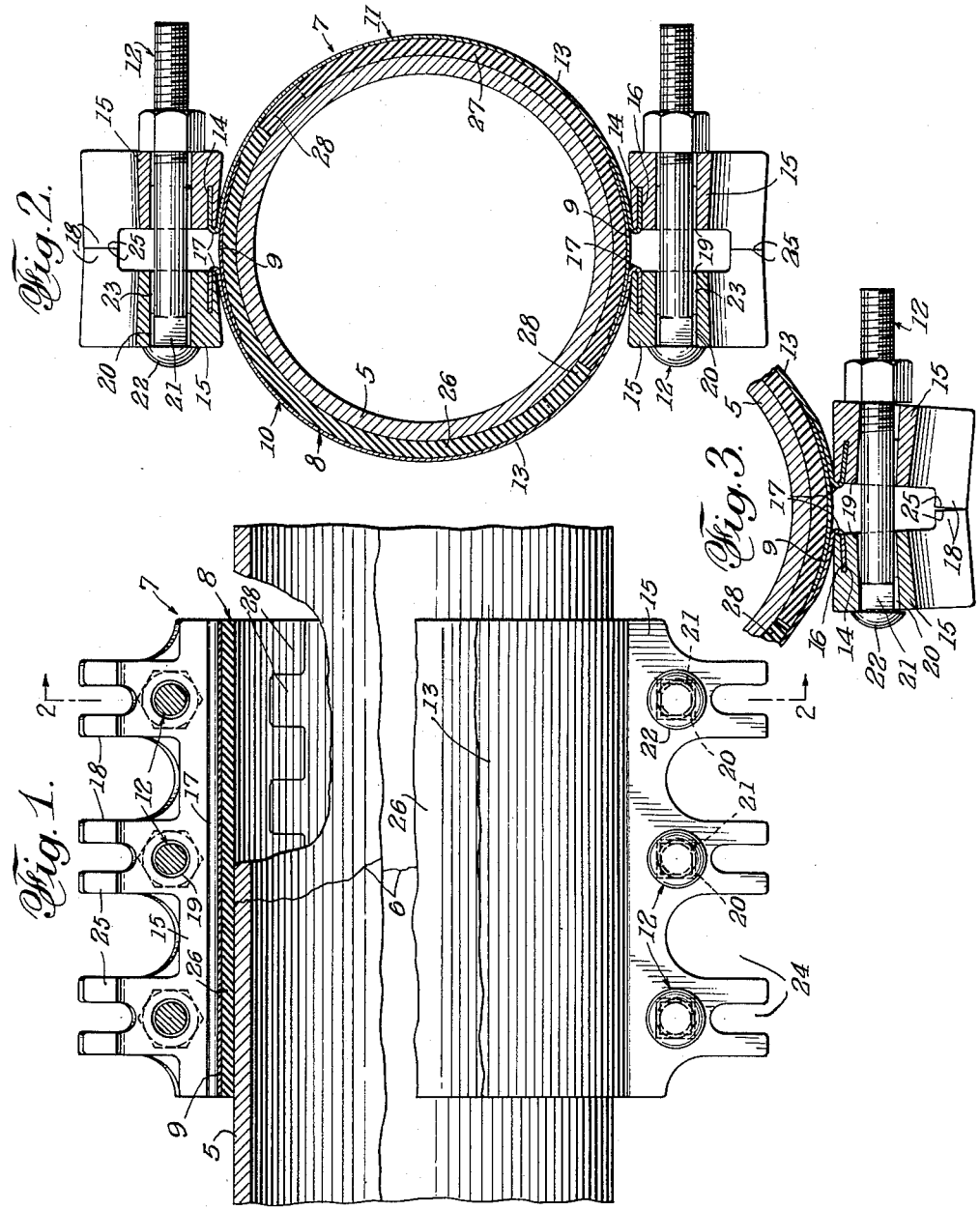

2,713,352
PIPE COUPLING
Edward H. Schustack, Los Angeles, Calif.

Application June 16, 1951, Serial No. 231,940

3 Claims. (Cl. 138—99)

This invention relates to a coupling for connecting the adjacent ends of pipes, connecting the fractured ends of a pipe, or sealing a leak in a pipe, as the case may be. The latter two cases are emergency repair conditions and, therefore, it is an object of the present invention to provide a pipe coupling that will effectively seal against leakage in a pipe and is adapted to be placed in operative position with easy facility even under adverse conditions.

Another object of the invention is to provide a novel pipe coupling that will seal relatively high pressures in pipes or conduits for oil, gas, water, steam, air, sewage, etc.

A further object of the invention is to provide a coupling in the form of a clamp connected by bolts, and to so form the clamp parts that the bolts are not subject to being bent when drawn up tightly with a resultant lessening of the strength of said bolts.

A further object of the invention is to provide the clamp parts with lugs having fulcrum portions outside of the place of application of the connecting bolts, whereby the latter have a power advantage to draw the clamps tightly together by mutually rocking the lugs on their fulcrum portions, all while the bolts remain straight and not subject to a bending moment force.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 1 is a partial elevational and partial longitudinal sectional view of a coupling according to the present invention, the same being shown as connecting the fractured ends of a pipe or conduit.

Fig. 2 is a cross-sectional view as taken on line 2—2 of Fig. 1.

Fig. 3 is a fragmentary cross-sectional view showing the coupling before the same is drawn up tightly.

Referring in greater detail to the drawing, the pipe 5 is representative of the adjacent ends of two pipes, a pipe that has a fault that results in leakage, or one, as shown, that has a fracture 6. The present coupling is shown in position to seal pipe 5 under any of the three conditions stated.

The coupling that is illustrated comprises, generally, a two-part clamp 7, a gasket liner 8 within the clamp, a pair of metallic shoes 9 to span across the gaps between the clamp parts 10 and 11, and a set of bolts 12 to connect said clamp parts. Clamp 7 may be of one or more parts.

The clamp parts 10 and 11 are preferably exactly alike and, therefore, interchangeable. As shown, each part comprises a sheet metal sleeve half 13 that is preferably cylindrically curved to conform to and be somewhat larger in diameter than the outer diameter of pipe 5. The opposite edges of each sleeve half are doubled back to provide flanges or tongues 14. Said sleeve halves are advantageously made of a corrosion-resistant metal such as copper and the same, therefore, are readily conformable to pipe 5 and to variations in the diametral symmetry of said pipe.

At the edges of each sleeve half there are provided cast lugs 15 that are substantially coextensive in length to the length of the sleeve halves. The mentioned flanges 14 extend into slots 16 formed in said lugs. Unless high corrosion resistance is desired, the lugs are advantageously made of cast iron.

It will be noted that the lines of bend 17, defined between sleeve halves 13 and flanges 14, are spaced when the clamp is applied, lugs 15, arranged in cooperating pairs, are similarly spaced. However, according to the invention, the outer ends of said lugs are each provided with a laterally directed extension or lip 18, the same being adapted to abut as shown while the remainder of the paired lugs are spaced.

A set of holes 19 is formed in each lug between slot 16 and lip 18, the number of holes may vary as desired, the holes in the lugs, as paired, being aligned to receive bolts 12. Since it is contemplated that said bolts be carriage bolts, the outer end of each hole 19 is formed square as at 20 to accommodate and non-rotationally hold the square portion 21 adjacent the head 22 of each respective bolt. The remaining inner end 23 of hole 19 is preferably round.

In order to lighten the lugs 15 without reducing the strength thereof, the same, between the bolts, may be relieved or cut out as suggested by recesses 24. Thus, lip 18 of each lug presents an interrupted and aligned series of fulcrum faces 25.

It will be noted that holes 18 are of a size to provide appreciable clearance for bolts 12 to obviate the need for extremely accurate alignment of the paired holes and also to allow limited relative angular engagement of the paired lugs without creating a bending force on the bolts. To this end, the round ends 23 of the holes may be made oval to provide increased clearance for the bolts in the plane of their adjustability.

While the lugs have been shown as cast elements, they may be forged or otherwise fabricated. There are instances where the lugs may be integrally formed from bent and folded portions of sleeve halves 13, providing that such bent and folded lugs are formed to have extensions or lips 18 similar to those shown in the drawing.

The gasket liner 8 is also formed of two parts 26 and 27, the same being preferably identically formed of one of the synthetic rubber compounds of which "neoprene" is an example. In the present case, the opposite edges of each gasket part 26 and 27 are castellated to provide spaced rectangular projections 28, the projections and spaces therebetween being the same size. The gasket parts are adapted to encircle pipe 5 with the respective projections 28 on one edge interfitting with those of a mating edge. The length of the gasket parts is substantially that of the clamp parts, as shown. A single encircling gasket may be used and, in instances, a partial gasket applied as a patch.

The shoes 9 are made of sheet metal similar to that of the sleeve halves. In practice the same are cemented or otherwise affixed to the outer faces of gasket parts 26 and 27. The shoes are preferably located 30° or more away from one edge of the gasket part to which affixed to insure that the joints or seams between said parts are offset from where the pairs of lugs meet. Fig. 2 shows a preferred arrangement.

The manner of applying the coupling is believed clear without further explanation. It will be noted from Fig. 3 that the fulcrum faces 25 of the pairs of lugs engage before the bolts are drawn up tight. As said bolts are tightened, the inner portions of the lugs are drawn toward each other, creating a tensile force on the sleeve halves 13 to, thereby, draw the latter tightly over the gasket to effectively seal any joint, seam, fracture or fault in pipe 5.

While there is an initial bending moment at bends 17, the same is quite small and is eliminated when faces 25 touch. It will be seen that there is relatively small change in angular relationship between the lugs of each pair. Accordingly, there is no tendency to bend the bolts even should it be necessary to draw the inner portions of the lugs closer together than shown. The power advantage afforded by the outwardly disposed fulcrum faces should be readily apparent.

While the invention that has been illustrated and described is now regarded as the preferred embodiment, the construction is, of course, subject to modifications without departing from the spirit and scope of the invention. It is, therefore, not desired to restrict the invention to the particular form of construction illustrated and described, but to cover all modifications that may fall within the scope of the appended claims.

Having thus described the invention, what is claimed and desired to be secured by Letters Patent is:

1. A pipe coupling or pipe patch clamp comprising a split flexible sleeve member, the edges of the split portion being bent over to form hooks, the distance between the edges of the split portion being slightly less than the circumference of the pipe so that when the sleeve is placed around the pipe a gap will be formed between the hooks, a pair of rigid draw-blocks for said hooks, each draw-block having means for engaging a hook on the sleeve member, each block being L-shaped in cross section and extending radially outwardly from the sleeve when the block is in sleeve-engaging position and each draw-block having adjacent edges and extending radially of the axis of the sleeve, one of said edges providing means forming a pivot point of engagement between the adjacent edges, a bolt extending through said draw-blocks and adapted when tightened to bring said adjacent edges together and decrease the gap between the adjacent hooks.

2. A pipe coupling or pipe patch clamp comprising first and second flexible metallic sleeve members terminating in bent-over edges constituting hooks, the adjacent hooks of said first and second sleeve members being spaced from each other to form a gap when said members are placed around said pipe, first and second pairs of frigid draw-blocks for said hooks, each draw-block having means for engaging the hook of its respective sleeve member, each block being L-shaped in cross section and extending radially outwardly from the sleeve when the block is in sleeve-engaging position and each pair of draw-blocks having adjacent edges and extending radially of the axis of the sleeve, one of said edges providing means forming a pivot point of engagement between the adjacent edges, bolts extending through said draw-blocks and adapted when tightened to bring said adjacent edges together and decrease the gap between the adjacent hooks.

3. A pipe coupling as defined in claim 2 which also includes a compressible gasket positioned between said pipe and said sleeves, said gasket having two edges meeting each other when said gasket is wrapped around said pipe, each of said edges terminating in a series of spaced teeth, the teeth of one edge fitting into the spaces between the teeth of the opposed edge, the sides of all teeth being substantially parallel to each other, the teeth of the opposed edges interleaving each other, whereby said interleaved teeth offer a continuous compressible gasket surface even when the circumference of said gasket is somewhat different than the circumference of said pipe.

References Cited in the file of this patent
UNITED STATES PATENTS

| Number | Name | Date |
|---|---|---|
| 812,162 | Bemis | Feb. 6, 1906 |
| 848,139 | Stuppar | Mar. 26, 1907 |
| 1,302,944 | Maclaren | May 6, 1919 |
| 1,638,230 | Alsaker | Aug. 9, 1927 |
| 1,668,499 | Geiser et al. | May 1, 1928 |
| 1,788,505 | Beard | Jan. 13, 1931 |
| 2,074,799 | Merrill | Mar. 23, 1937 |
| 2,127,456 | Adams | Aug. 16, 1938 |
| 2,213,022 | Stauffer | Aug. 27, 1940 |
| 2,222,289 | Fordon | Nov. 19, 1940 |
| 2,227,551 | Morris | Jan. 7, 1941 |
| 2,417,741 | Dillon | Mar. 8, 1947 |
| 2,599,882 | Adams | June 10, 1952 |